G. ZUZULY.
SCRAPING TOOL.
APPLICATION FILED AUG. 25, 1911.
1,014,798.
Patented Jan. 16, 1912.
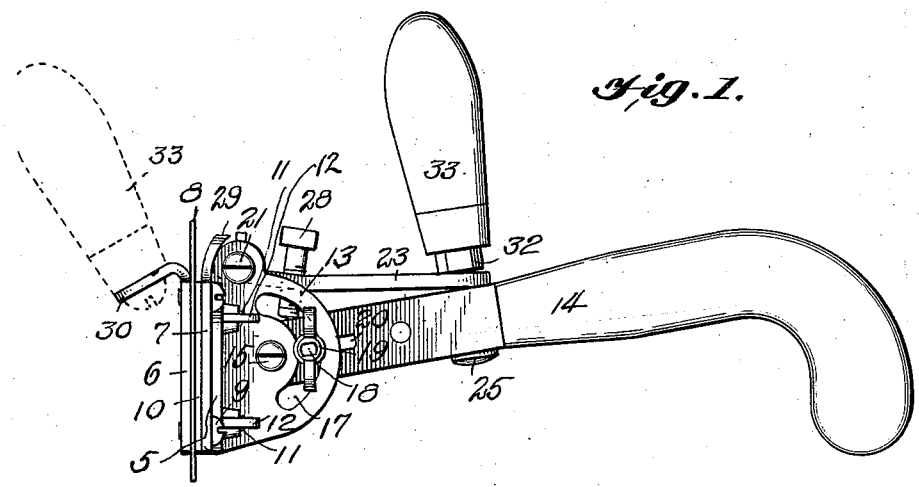
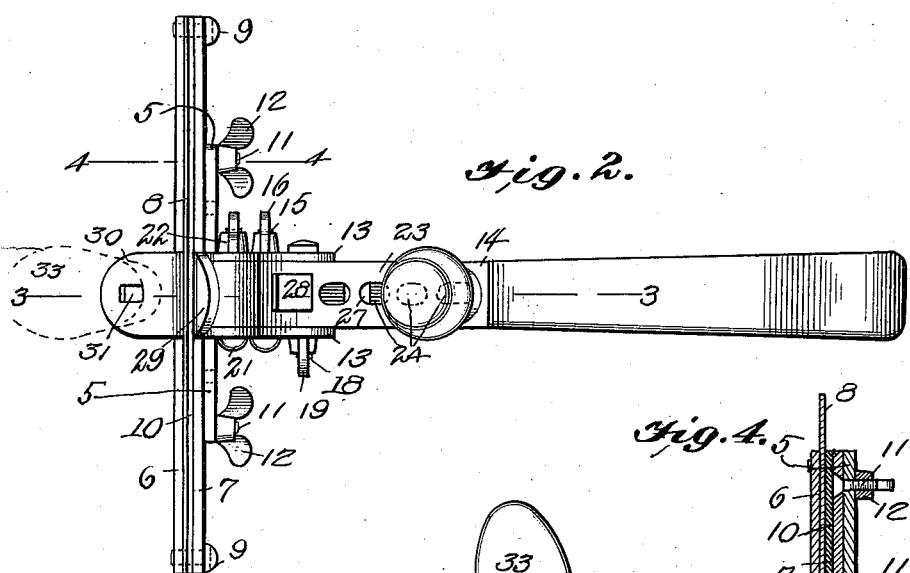
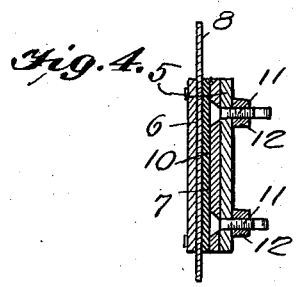
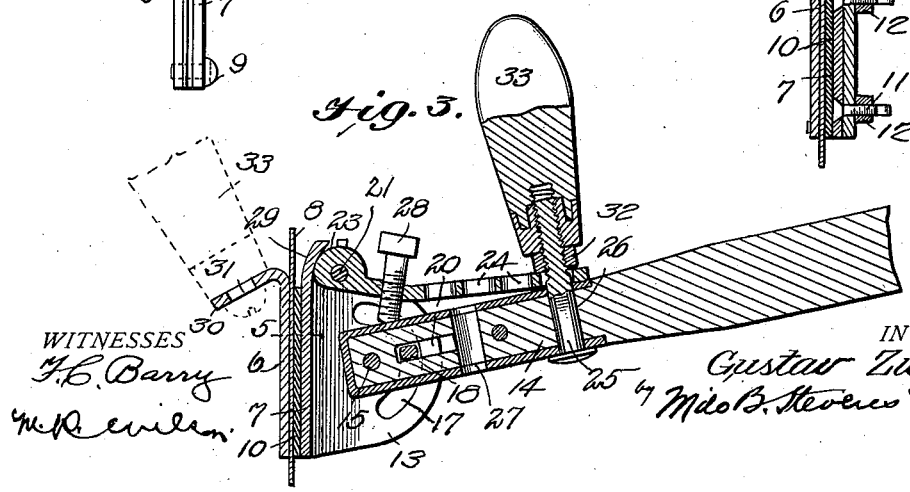
WITNESSES
F. C. Barry
M. R. Evilin
INVENTOR
Gustav Zuzuly
by Milo B. Stevens & Co.
Attorneys
COLUMBIA PLANOGRAPH CO., WASHINGTON, D. C.

UNITED STATES PATENT OFFICE.

GUSTAV ZUZULY, OF PULLMAN, ILLINOIS.

SCRAPING-TOOL.

1,014,798. Specification of Letters Patent. Patented Jan. 16, 1912.

Application filed August 25, 1911. Serial No. 646,058.

*To all whom it may concern:*

Be it known that I, GUSTAV ZUZULY, a subject of the Emperor of Austria-Hungary, residing at Pullman, in the county of Cook and State of Illinois, have invented certain new and useful Improvements in Scraping-Tools, of which the following is a specification.

This invention relates to scraping tools used in the cabinet making and other woodworking trades, and its object is to provide in a tool of this kind a novel handle attachment, and means whereby the holder of the scraper blade may be adjusted to change the inclination of the blade.

The invention also has for its object to provide a tool of the kind stated which is simple in construction, and efficient in operation, and one embodying certain novel features of construction to be hereinafter described and claimed.

In the accompanying drawing forming a part of this specification, Figure 1 is an elevation of the tool. Fig. 2 is a plan view. Figs. 3 and 4 are sections on the lines 3—3 and 4—4, respectively, of Fig. 2.

Referring specifically to the drawing, the head of the tool comprises two plates 5 carrying front and rear jaws 6 and 7, respectively, between which the scraping blade 8 is held. The jaws comprise two flat plates which are clamped together, with the blade therebetween, by screws 9. A sheet 10 of rubber is interposed between the rear face of the blade and the rear jaw 7 in order that the blade may be firmly held and prevented from slipping when the jaws are tightened up. The rear jaw 7 carries bolts 11 which pass through the head 5, and are provided with wing nuts 12, which latter, upon being screwed against the head, rigidly fasten the jaw thereto. The heads of the bolts are countersunk in the jaw.

The two plates 5 forming the head of the tool are spaced apart at their inner edges, and from said edges extend, outwardly, flanges 13 between which the handle 14 of the tool extends, said handle being pivotally connected to a transverse bolt 15 extending through the flanges and therebetween. This bolt is secured by a wing nut 16. The flanges have arcuate slots 17, and the handle carries a transverse bolt 18 which works in these slots. The bolt 18 is provided with a wing nut 19, which, when tightened up, locks the handle in adjusted position. The handle has a slot 20 through which the bolt 18 passes, and said bolt is flattened on opposite sides, with the slot correspondingly shaped, whereby said bolt is prevented from rotating. The flanges 13 are also connected across, at the top, by a bolt 21 secured by a wing nut 22. On this bolt is pivoted a tongue 23 which extends rearwardly, above the handle 14. This tongue has a number of apertures 24, through a selected one of which is extended a bolt 25 passing vertically through an opening 26 of the handle. The bolt 25 is flattened on opposite sides and the bolt hole 26 in the handle is correspondingly shaped, so that said bolt is prevented from rotating. The handle has a second hole 27 for the bolt 25 in order that a greater range of adjustment may be had. The tongue 23 carries, adjacent to its pivot, a set screw 28 which is designed to be screwed down against the top of the handle, and thus add to the rigidity of the adjustment. From the top edge of the jaw 7 extends a lip 29 which fits the upper portion of the flanges 13, and from the top edge of the jaw 6, midway between its ends, extends a lip 30 having an aperture 31.

In operation, the slant of the blade 8 is adjusted by varying the angle of the handle relatively to the head 5, or vice versa, which is readily done by removing the bolt 25 and loosening the wing nut 19 and the set screw 28. After the necessary adjustment is made, the bolt 25 is passed through the openings 26 or 27 and through a selected one of the apertures 24, and is secured by a nut 32. The wing nut 19 and set screw 28 are also tightened up, whereupon the parts are rigidly held in adjusted position. An auxiliary handle 33 is provided which screws on the upper projecting end of the bolt 25. If desired, this handle may be removed and attached to the lip 30 by means of a screw passing through the aperture 31 thereof and into the end of the handle, as shown by dotted lines in Fig. 1.

I claim:

1. A scraper comprising a head having outstanding flanges, blade-holding jaws carried by the head, a handle extending between the flanges, a pivot bolt passing through the handle and the flanges, an apertured tongue pivotally mounted between the flanges above the handle, and a bolt passing through the handle and one of the apertures of the tongue.

2. A scraper comprising a head having outstanding flanges provided with arcuate slots, blade-holding jaws carried by the head, a handle extending between the flanges, a pivot bolt passing through the handle and the flanges, a bolt passing through the handle and the slots of the flanges, an apertured tongue pivotally mounted between the flanges above the handle, and a bolt passing through the handle and one of the apertures of the tongue.

3. A scraper comprising a head having outstanding flanges, blade-holding jaws carried by the head, a handle extending between the flanges, a pivot bolt passing through the handle and the flanges, an apertured tongue pivotally mounted between the flanges above the handle, a bolt passing through the handle and one of the apertures of the tongue, and a set screw carried by the tongue and engageable with the top of the handle.

4. A scraper comprising a head having outstanding flanges, blade-holding jaws carried by the head, a handle extending between the flanges, a pivot bolt passing through the handle and the flanges, an apertured tongue pivotally mounted between the flanges above the handle, a bolt passing through the handle and one of the apertures of the tongue, and an auxiliary handle connected to the bolt.

5. A scraper comprising a head consisting of a pair of plates which are spaced apart at their inner edges and have outstanding flanges at said edges, blade-holding jaws carried by the head, a handle extending between the flanges and pivotally connected thereto, a tongue pivotally mounted between the flanges above the handle, and an adjustable connection between the handle and the free end of the tongue.

In testimony whereof I affix my signature in presence of two witnesses.

GUSTAV ZUZULY.

Witnesses:
 DESANCA ZUZULY,
 BOGDAU ZUZULY.

Copies of this patent may be obtained for five cents each, by addressing the "Commissioner of Patents, Washington, D. C."